US008465368B2

(12) United States Patent
Hardy et al.

(10) Patent No.: US 8,465,368 B2
(45) Date of Patent: Jun. 18, 2013

(54) METHOD AND APPARATUS FOR CONDUCTING EVENT BETTING

(75) Inventors: Dow Hardy, Marlborough, MA (US); Mark E. Herrmann, Wellesley, MA (US); Bijan Sabet, Sudbury, MA (US); Paul LaRocca, Westport, CT (US); Steven N. Kane, Brookline, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 592 days.

(21) Appl. No.: 11/328,441

(22) Filed: Jan. 9, 2006

(65) Prior Publication Data

US 2006/0172803 A1 Aug. 3, 2006

Related U.S. Application Data

(60) Provisional application No. 60/642,613, filed on Jan. 10, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ............ 463/42; 463/3; 463/5; 463/8; 463/20; 463/25; 463/40; 705/37; 273/292

(58) Field of Classification Search
USPC .. 463/42, 3, 5, 8, 20, 25, 40; 705/37; 273/292
See application file for complete search history.

(56) References Cited

U.S. PATENT DOCUMENTS

| | | | | |
|---|---|---|---|---|
| 5,647,795 | A * | 7/1997 | Stanton | 463/25 |
| 5,800,268 | A * | 9/1998 | Molnick | 463/40 |
| 2003/0003997 | A1* | 1/2003 | Vuong et al. | 463/42 |
| 2003/0097326 | A1* | 5/2003 | Kivimaki | 705/37 |
| 2003/0157976 | A1* | 8/2003 | Simon et al. | 463/1 |
| 2004/0063484 | A1* | 4/2004 | Dreaper et al. | 463/16 |
| 2004/0204213 | A1* | 10/2004 | Schugar et al. | 463/6 |
| 2005/0164779 | A1* | 7/2005 | Okuniewicz | 463/25 |

FOREIGN PATENT DOCUMENTS

WO WO 9738366 A1 * 10/1997

* cited by examiner

*Primary Examiner* — Omkar Deodhar
*Assistant Examiner* — Adetokunbo O Torimiro
(74) *Attorney, Agent, or Firm* — Dority & Manning, P.A.

(57) ABSTRACT

The field of the invention relates generally to sports and event betting, and more specifically to the use of the Internet in land-based casino sports and event betting. A bettor signs onto an Internet website to find what bets are being accepted and the bettor then places and registers a bet. The player then goes and places pays for the bet at a land-based casino prior to the start of the event. Further, follow-up rounds of making a wager may then be performed over a network such as, for example, the Internet.

51 Claims, 7 Drawing Sheets

METHOD AND APPARATUS FOR CONDUCTING EVENT BETTING

RELATED APPLICATIONS

This application claims priority under 35 U.S.C. §119(e) to U.S. Provisional Application Ser. No. 60/642,613, entitled "METHOD AND APPARATUS FOR CONDUCTING EVENT BETTING," filed on Jan. 10, 2005. This application is herein incorporated by reference in its entirety.

FIELD OF THE INVENTION

The field of the invention relates generally to sports and event betting, and more specifically to the use of the Internet in land-based casino sports and event betting.

BACKGROUND

Betting on sports and other events is a multi-billion dollar business for casinos and the Internet around the world. Land-based casinos have large sports and event betting parlors for attracting bettors. These parlors display the bets that a person may make on various sporting or types of events. Bets are placed on most major sports including professional and college football, soccer, baseball, basketball, auto racing, and ice hockey, as well as cricket, rugby. Further, bets are placed on various sports tournaments including the NCAA Men's and Women's Basketball Championships and World Cup Soccer. Also, bets may be placed on other types of events including a selection of the winner of a reality television show (e.g., the Survivor reality show), when the first person lands on Mars, the winner of the next United States Presidential election, or any other type of event.

Land-based casinos generally restrict bettors to place their bets and pay for them on-site (e.g., in the casino). Because of this requirement, it is thought that sports and event bettors will then play other games at the land-based casino. For some casinos, bets may also be placed by kiosks placed throughout the casino so that the bettor need not travel too far from where they may be playing other games to place bets. A few land-based casinos presently take sports and event bets completely over the Internet where the bettor makes and pays for the bet on-line. Additionally, websites that exclusively perform on-line betting and numerous Internet-only casinos (with no land-based counterpart) now take sports and event bets. There is a present and recurring need for new methods for making sports and event bets that are advantageous to both the bettor and to the bet-taking establishment.

SUMMARY

According to one aspect of the present invention, a method for conducting event betting is provided. The method comprises acts of registering one or more bets by a bettor off-site from a casino, and accepting a payment made by the bettor for the one or more registered bets at a land-based casino. According to one embodiment of the invention, the act of registering includes an act of registering the one or more bets using interactive television. According to another embodiment, the act of registering includes an act of registering the one or more bets using at least one of the Internet and a website. According to another embodiment, the method further comprises an act of permitting the bettor to view at least one of the one or more registered bets. According to another embodiment, the method further comprises an act of providing, to the bettor, a registration number for the one or more registered bets.

According to one embodiment of the invention, the act of providing is performed by a website operator. According to another embodiment, the method further comprises an act of permitting the bettor to pay for the one or more bets within the casino using at least one of a cashier, a kiosk, and a wireless interface. According to another embodiment, the method further comprises acts of accepting, by the casino, a registration number from the bettor and confirming the registration number for the one or more bets. According to another embodiment, the bettor is permitted to pay for the one or more registered bets with at least one of money and loyalty points. According to another embodiment, the bettor is permitted to pay for the one or more registered bets by at least one of cash, a debit card, a credit card, an account credit, and a loyalty program credit. According to another embodiment, the method further comprises an act of determining a payout for at least one of the one or more registered bets. According to another embodiment, the payout for winning may include at least one of money, a credit, merchandise, and loyalty points.

According to one embodiment of the invention, the determined payout includes money, and the method further comprises an act of paying out money including providing at least one of cash, a check, a debit card, and an account credit. According to another embodiment, the determined payout includes loyalty points, and the method further comprises an act of paying out loyalty points including providing at least one of a loyalty program credit and an account credit. According to another embodiment, at least one of a website operator and a computer system automatically determines if the one or more registered bets is a winning bet. According to another embodiment, at least one of the website operator and computer system automatically notifies the bettor of the winning bet. According to another embodiment, the bettor is automatically notified of a win in an electronic manner, including by an e-mail message, by the Internet, by a telephone, and by a text message.

According to one embodiment of the invention, odds for the one or more bets are set when the one or more bets are registered. According to another embodiment, odds for the one or more bets are set when the one or more bets are paid for. According to another embodiment, odds for the one or more bets change as the event approaches. According to another embodiment, the method further comprises an act of requiring the bettor to return to the land-based casino to receive winnings. According to another embodiment, the event is a sports event.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

Figure 1:
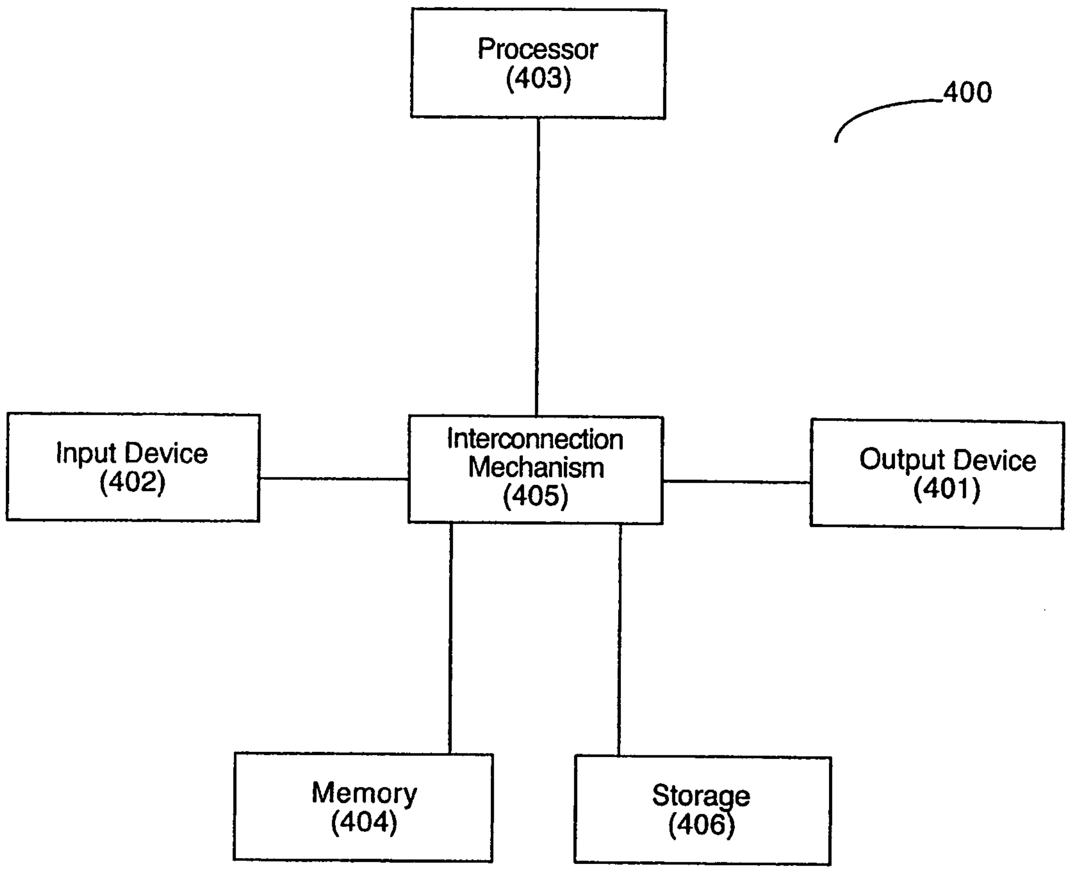
FIG. 1 is a block diagram of a general-purpose computer system upon which various embodiments of the invention may be implemented.

Bettors often enjoy the lively atmosphere of a land-based casino when betting on sports or any other type event. Land-based casinos foster this atmosphere by providing rooms for viewing sports or events and by hosting parties that draw many bettors including the Super Bowl and the NCAA Men's Basketball Championship. Land-based casinos like to draw sports and event bettors so increase foot traffic through the casino and to hopefully increase gaming revenue.

However, it is appreciated that betting on sports or an event may be inconvenient for a bettor when using a land-based casino. A bettor must go to the land-based casino to find out the bets taken and the odds; a bettor will often go to the land-based casino only if he or she is certain that he or she wants to place a bet on a specific event or sports activity. However, with the advent of the Internet betting sites and the on-line casinos, the land-based casinos are at a disadvantage to obtaining bettors that can get information on other betting opportunities more easily.

One aspect of the present invention relates to a system and method for conducting sports and event betting. According to one aspect, the ease of using a network (e.g., the Internet, cellular, and/or other type of network) is combined with sports and event betting at a land-based casino. Thus, sport and other types of event betting are improved, as betting is more convenient to the bettor.

According to one embodiment, a bettor may sign onto a website (e.g., through the Internet and/or other type of network) to place a bet on any sports or other event including professional and college football, soccer, baseball, basketball, auto racing, and ice hockey, as well as cricket, rugby, and various sports tournaments including the NCAA Men's and Women's Basketball Championships and World Cup Soccer. Other events upon which a bet may be placed include any type of event, such as, for example, choosing the winner of a reality television show (e.g., the Survivor reality show), when the first person lands on Mars, or the winner of the next United States Presidential election.

According to one embodiment, a website (e.g., made available through the Internet or other type of network) includes a listing of all the possible bets that may be made. According to another embodiment, the bettor may then select the wagers to be made on-line and register the wagers to be made with the casino. One advantage of this is especially apparent for complicated or multiple selection events that may involve multiple selections of events to occur. For instance, a bet involving the entire NCAA Men's Basketball Championship Tournament which has 63 games and 64 teams is a complicated bet that may require multiple event selections. In another example, choosing a fantasy league team (e.g. for the National Football League (NFL)) may have as many as 30 team members or positions and as many as 60 choices for each position, further complicating the wagering process. However, such traditional wagers were limited to being placed in the gaming establishment by the bettor. According to one aspect, the bettor is permitted to arrange the bet outside of the gaming establishment, and to make payment for the bet in a legal manner.

According to another embodiment, a bettor may propose a bet for the website operator to consider. According to another embodiment, a registration number is issued by the website operator if the bet is accepted. According to another embodiment, the bettor then proceeds to the land-based casino running the website and pays for the registered bet. According to one aspect, by permitting the bettor to making the actual payment for the wager at the land-based casino, legal issues with Internet betting in the United States are reduced or eliminated. This method is believed to provide convenience to the bettor because the bettor can determine and place their bet(s) prior to going to the casino. Further, such a method may provide additional foot traffic for the casinos to enhance play of their other games, as bettors are required to travel to the casino to make payment.

Figure 7:
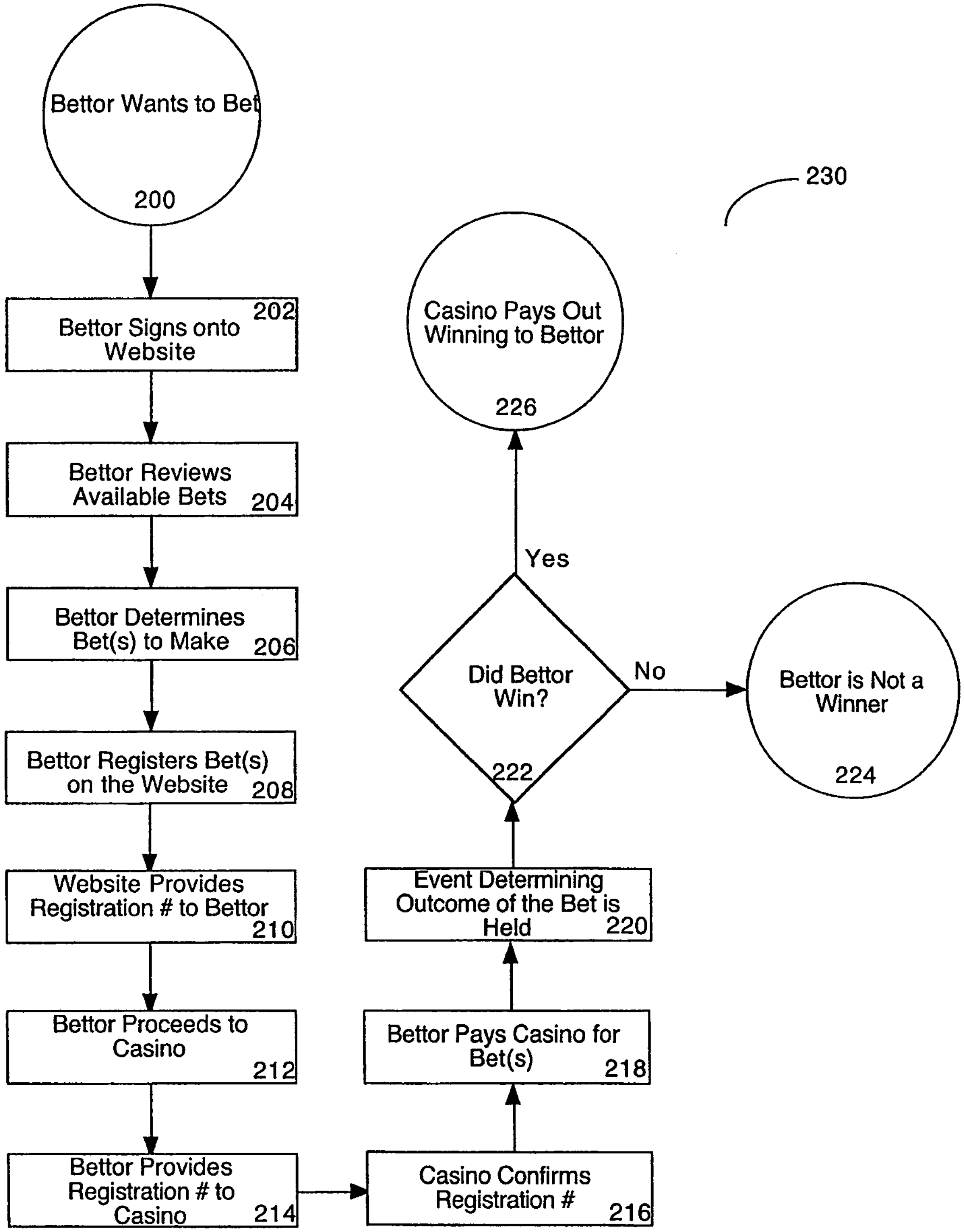
FIG. 7 is a diagram showing a flow chart of a process for placing a sports bet according to one embodiment of the invention.

FIG. 7 shows one example process for conducting sports and event betting according to one embodiment of the present invention. At block 200, process 230 begins with a bettor determining that he or she wants to place a bet on a sports or other event. At block 202, the bettor signs onto a website or other resource accessible through a communication network. In one example system, the player accesses a website that includes an interface (e.g., a graphical user interface (GUI)) in which the player may log onto for security. Further, the player may be permitted to access account information and/or information specific to the bettor. This interface may be, for example, used to access the website or Internet, or may be any other interface (e.g., an interface used to access a download website used for downloading betting software). The interface may be, for example, an HTML, Java, or other type interface.

At block 204, the bettor reviews the available bets on the website. According to one embodiment, the website may list all or some of the possible bets that may be made. The possible bets that may be shown may be determined according to the bettor's account or betting profile (e.g., possible football bets will not be shown to a bettor not interested in football). Available bets may also be shown based on the historical betting behavior of the bettor.

Odds shown for a possible bet may be set or may be variable depending upon when the bet is registered or when the bet is paid for. For example, a bet on the winner of the Major League Baseball World Series may have 6:1 odds after the regular season and before the baseball playoffs start, 1:1 odds just before the World Series starts, and 1:4 odds after the third game of the Series. For this example, the odds of the registered bet may be determined at the time the bet is registered or at the time the bet is paid for. If the odds for a registered bet are determined at the time the bet is registered, the land-based casino may require payment for the registered bet within a specified time period (e.g. one minute, one hour, one day, one week, one month, etc.) and this specified time period may shorten as the sports or other event approaches.

At block 206, the bettor determines the bet(s) to make and at block 208, the bettor registers the bet(s). For instance, the bets may be registered on a website (e.g., through a communication network including the Internet, cellular network, etc.). The bettor may make a bet listed on the website. Alternatively or in addition to the offered bets that are listed, the player may propose a bet not on the website. For instance, in the case where a bet is not listed on the website, the bettor may state the specific event that is being bet on and the bettor or the website operator may determine the odds to be given to the bettor for the bet.

When the website operator accepts the bet, the website may provide a registration, transaction, or confirmation number to the bettor for the bet(s) at block 210. The bettor then proceeds to the land-based casino at block 212 for payment. For instance, the bettor may proceed to a cashier, a kiosk, or other means available for paying for the bet(s) at the casino or other legal gambling jurisdiction. At block 214, the bettor provides the bet registration number to the casino, the casino confirms the registration number at block 216. At block 218, the bettor pays the casino for the bet(s), and the bettor may obtain a betting slip showing the bet(s) placed and the odds on the bet(s).

At block 220, the event is held that determines the outcome of the bet and the casino determines if the bettor is a winner at block 222. If the bettor is a winner, the casino then pays out the winnings to the bettor at block 226. To receive the winnings, a bettor may be required to return to the casino. If the bettor is not a winner, no payout occurs (block 224).

At block 220, it is possible that the bettor may need to make more picks on the same bet. For example, a bettor may need to make more picks for second and other additional rounds of a multiple round tournament based upon the previous round's results. Such a tournament may include, for example, the FIFA World Cup in soccer or the NCAA Men's Basketball Championship. In such a tournament, it is possible that a bettor may need to make all picks for all rounds before placing the bet.

When paying for a registered bet, a bettor may pay, for instance, using money, loyalty points, combination thereof, or any other payment method. In particular, a bettor may pay using money by debit card, credit card, check, cash or from an account credit either with the gaming operator or an affiliated organization. Alternatively or in addition to other payment methods, a bettor may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. The bettor may pay in person (e.g., by using a cashier) or by other methods within the casino including telephone, handheld device, or kiosk. Payment may be in any form that is legal in the particular jurisdiction.

The computer system or game operator may automatically determine when a bettor is a winner. Such a result may be automatically authenticated and verified by the computer system. In this instance, the computer system may then notify the bettor that he or she has won and what the winnings are. Notification of winning to a bettor may occur by mail, e-mail, computer web or network, telephone, television, pager, fax, kiosk or any other method.

After a winner is authenticated and verified, the computer system may then notify all bettors of the win. Additionally, the computer system may display the winning bet, the bettor's identity or the payout.

A bettor may also be able to replay or review a past bets using an audio-enabled or video-enabled device. For instance, a kiosk, telephone having a display, television, computer or handheld device may be used to view past bets. By accessing a selected bet in the computer system, a game player may be able to see the event outcome, the bet odds, and the payout.

In one embodiment, a computer system may be used to operate most acts of the betting operation, including taking, registering, and paying out bets. For instance, computer system(s) used to perform betting functions according to one embodiment may include single or multiple computer systems, one or more of which may include a supercomputer, a minicomputer, a mainframe computer, or a personal computer. A computer system used to run-the betting operation may also include any combination of computer system types that cooperate to accomplish system-level tasks. Multiple computer systems may also be used to run one or more betting operations. The computer system also may include input or output devices, displays, or storage units to facilitate the betting operation. It should be appreciated that any computer system or systems may be used, and the invention is not limited to any number, type, or configuration of computer systems.

Figure 3:
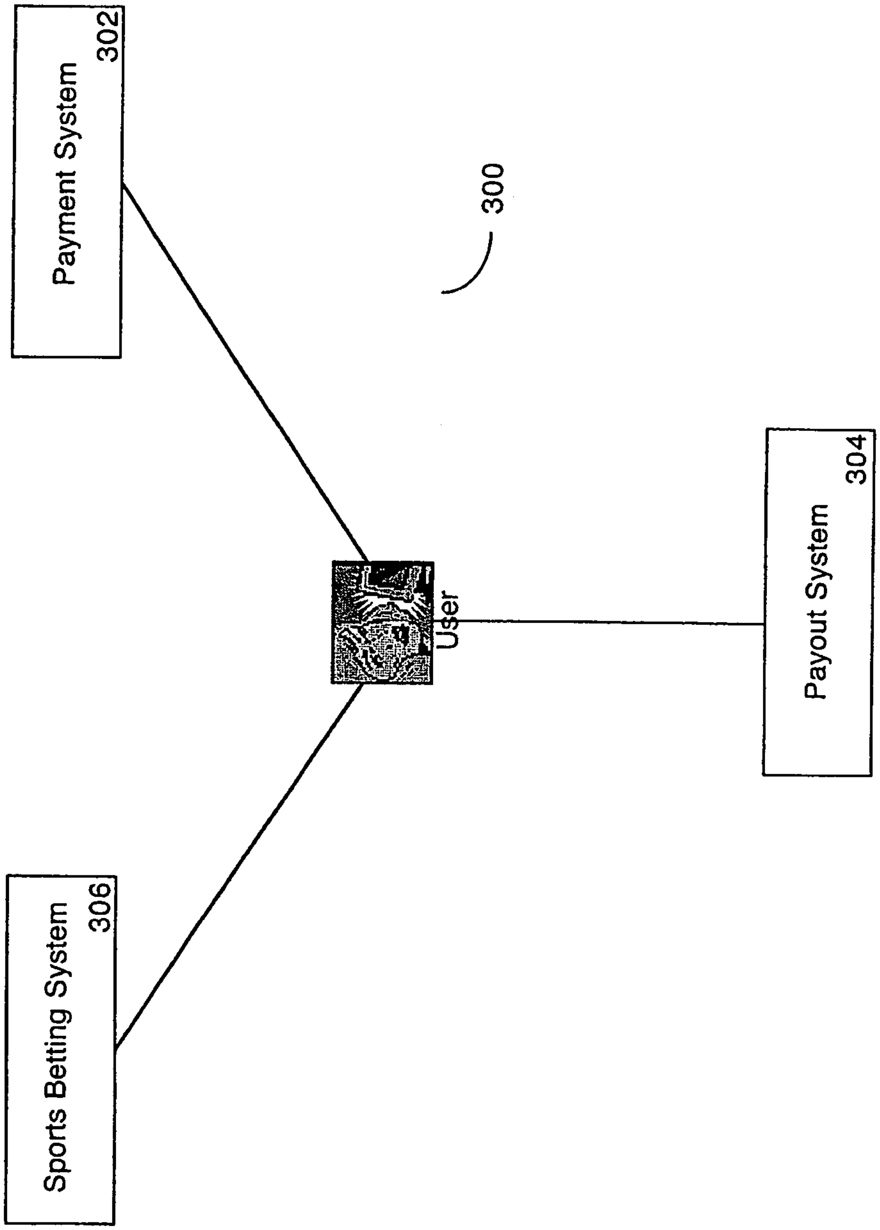
FIG. 3 is a diagram showing components of the sports betting computer system according to one embodiment of the invention.

A computer system (e.g., system 300) that executes the betting operation according to various embodiments of the invention may include, for example, one or more component systems (e.g., systems 302, 304, and/or 306 as shown in FIG. 3). One system component (e.g., payment system 302) may handle payment by bettors. Another system component (e.g., sports betting system 306) may handle taking and registering bets for one or more events, including sporting event. Yet another system (e.g., payout system 304) may handle making payouts to players. Such a betting system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below.

A payment component (e.g., system 302) may include one or more of a number of well-known systems. For example, a bettor may be able to pay for a bet through a casino cashier, kiosk or other means that is connected to the payment computer system through an interface. In the computer, data may be stored in a database that is stored in the memory of a computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Figure 4:
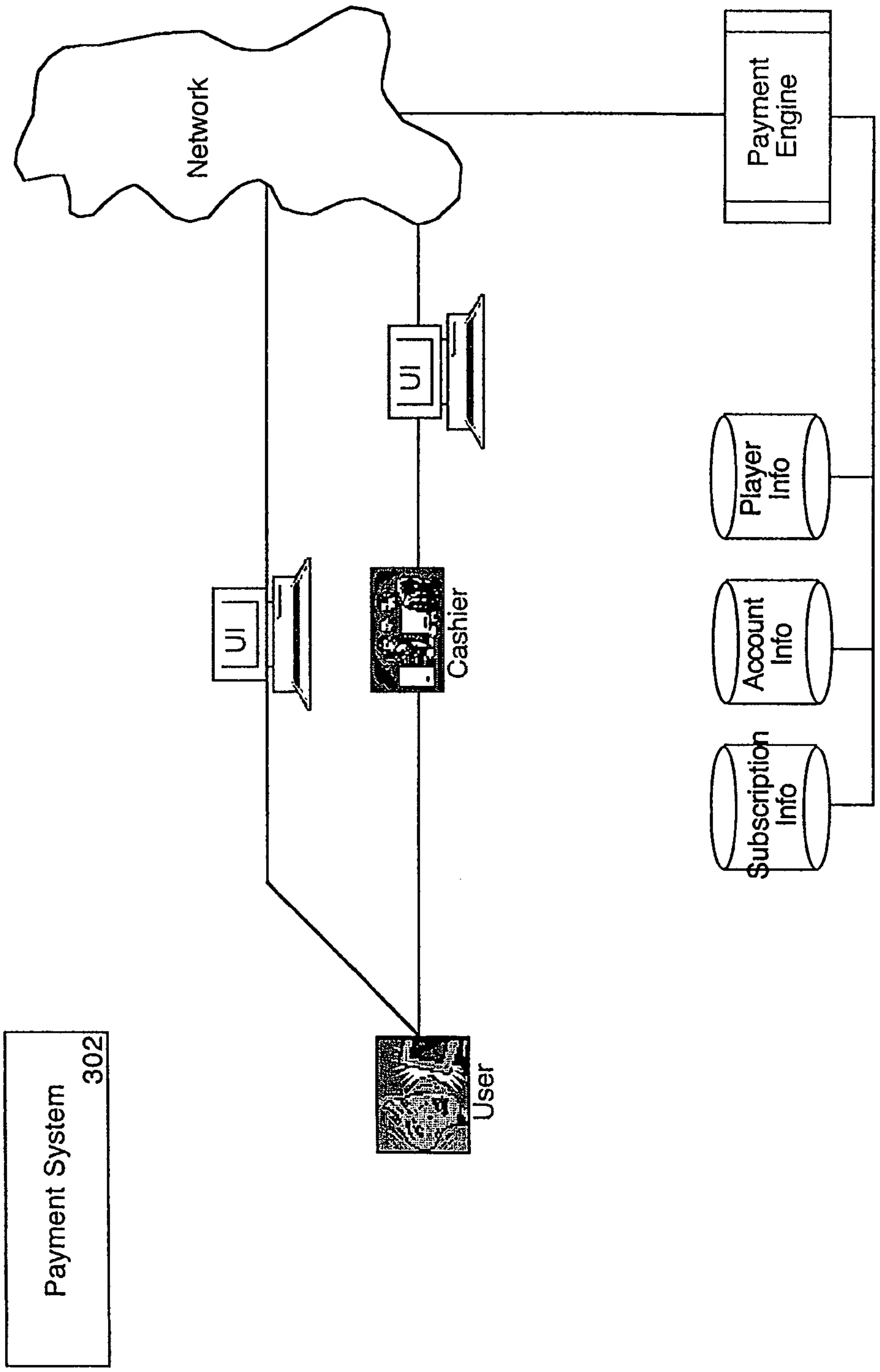
FIG. 4 is a diagram showing components of a payment subsystem according to one embodiment of the invention.

Bettor information may also be entered into a payment system component (e.g., pyment system 302 as shown in FIG. 4). Bettor information that may be input includes name, address, telephone number and age, and payment information may include a credit or debit card number or loyalty account information. Based upon the payment information, the call center representative may verify that the payment information is valid and that enough credit or funds is available for the player's bet(s).

Various pay systems and one or more user interfaces may be located on computer systems coupled by a network with the computer system(s) storing data having bettor, account and subscription information. As used herein, a "network" or a "communications network" is a group of two or more devices interconnected by one or more segments of transmission media or active communications equipment on which communications may be exchanged between the devices.

The above examples are merely illustrative embodiments of a payment system component. It should be appreciated that such an illustrative embodiment is not intended to limit the scope of the invention, as any of numerous other implementations of the pay system, for example, variations for on-site casino payment, are possible and are intended to fall within the scope of the invention. For example, the payment system may include using pay-per-view systems associated with interactive television in a casino hotel or the pay engine may additionally deliver a receipt to the player by either e-mail or mail. None of the claims set forth below are intended to be limited to any particular implementation of a pay system unless such claim includes a limitation explicitly reciting a particular implementation.

Figure 5:
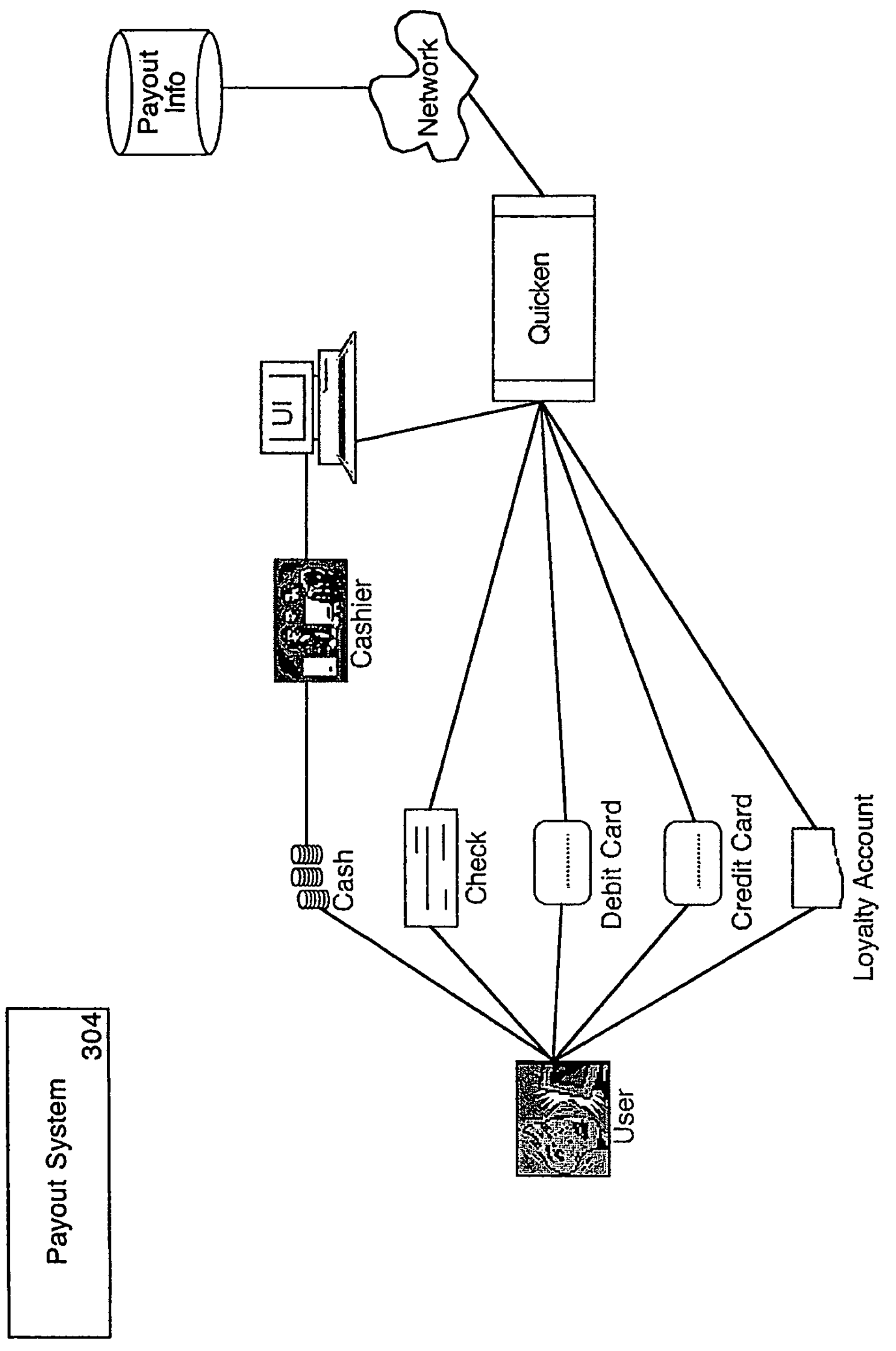
FIG. 5 is a diagram showing components of a payout subsystem according to one embodiment of the invention.

Payout systems (e.g., system 304) are also well known. Any of a number of standard systems or payout engines for making payouts for winning may be used according to one embodiment of the present invention as shown in FIG. 5. For example, a standard application programming interface such as 'Quicken' (available commercially from Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of a pay system unless such claim includes a limitation explicitly reciting a particular implementation.

Figure 6:
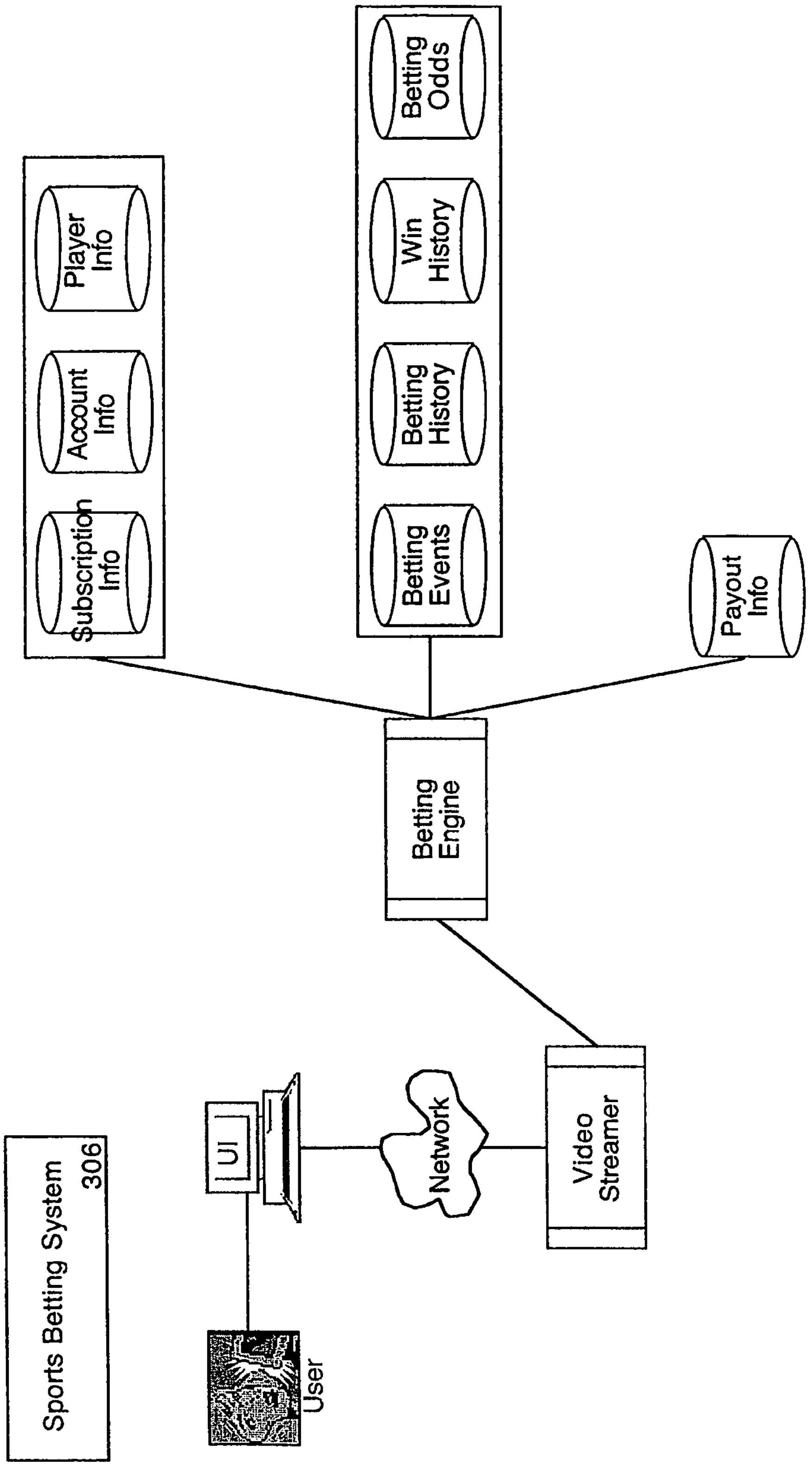
FIG. 6 is a diagram showing comnponents of a sports betting subsystem according to one embodiment of the invention.

A sports and event betting system (e.g., system 306 as shown in FIG. 6) according to one embodiment of the invention may comprise of a number of components for performing specific functions. These components may include, for example, storage means that store data structures having information relating to betting events and odds. For example, such information may include event date, time, and location, bettor's betting and win history, and event odds and their dependence upon time of payment. A sports and event betting system may also include components to access payment and payout data structures.

The sports and event betting system may also include a betting engine. A betting engine may perform, for example, some functions according to process 230 shown in FIG. 7 and described above. It should be appreciated that the betting process 230 may include more or less acts as shown in FIG. 7, and that the invention is not limited to any particular number of order of acts (e.g., the order illustrated in FIG. 7) as the acts may be performed in other orders, may include additional acts and one or more of the acts of process 230 may be performed in series or in parallel to one or more other acts, or parts thereof. For example, blocks 214 and 218, or parts thereof, may be performed together, and act 216 may be performed at any point after block 214 (including after block 218) of process 230.

Process 230 is merely an illustrative embodiment of a method for performing sports or event betting. Such an illustrative embodiment is not intended to limit the scope of the invention, as any of numerous other implementations for performing sports or event betting. None of the claims set forth below are intended to be limited to any particular implementation of a method of sports or event betting, unless such claim includes a limitation explicitly reciting a particular implementation.

Process 230, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 1, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the event betting system may include a software component (e.g., a driver) that streams video via a broadband, satellite or wireless medium to a user interface. If the game is played completely automatically, the user interface may be merely a video terminal including television with no user input means. Viewing access may be controlled by standard methods for conditional access including using set top box addresses, telephone numbers or internet protocol (IP) addresses.

The above is merely an illustrative embodiment of a sports and event betting system. Such an illustrative embodiment is not intended to limit the scope of the invention, as any of numerous other implementations of a sports and event betting system, for example, variations of conditional access, are possible and are intended to fall within the scope of the invention. None of the claims set forth below are intended to be limited to any particular implementation of a sports and event betting system unless such claim includes a limitation explicitly reciting a particular implementation.

System 300, and components thereof such as the payment, payout and betting engines, may be implemented using software (e.g., C, C#, C++, Java, or a combination thereof), hardware (e.g., one or more application-specific integrated circuits, processors or other hardware), firmware (e.g., electrically-programmed memory) or any combination thereof. One or more of the components of 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented on a computer system described below in relation to FIGS. 1 and 2.

System 300 is merely an illustrative embodiment of the game system. Such an illustrative embodiment is not intended to limit the scope of the invention, as any of numerous other implementations of the sports and event betting system, for example, variations of system 300, are possible and are intended to fall within the scope of the invention. For example, interactive television may also be used to view the available bets. None of the claims set forth below are intended to be limited to any particular implementation of the betting system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

For example, various aspects of the invention may be implemented as specialized software executing in a general-purpose computer system 400 such as that shown in FIG. 1. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, or speaker. In addition, computer system 400 may contain one or more interfaces (not shown) that connect computer system 400 to a communication network (in addition or as an alternative to the interconnection mechanism 405.

Figure 2:
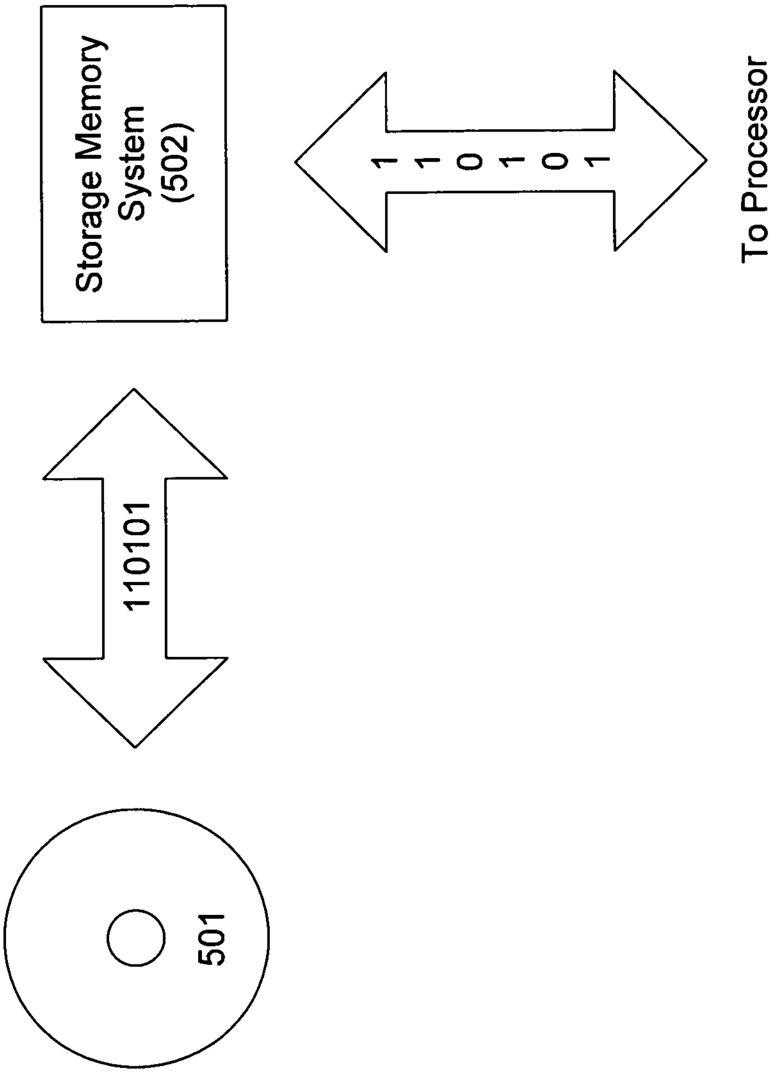
FIG. 2 is a block diagram of a computer data storage system with which various embodiments of the invention may be practiced.

The storage system 406, shown in greater detail in FIG. 2, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architecture or components that that shown in FIG. 1.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "containing", "characterized by" and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition 2$^{nd}$ Revision, May 2004), Section 2111.03.

Use of ordinal terms such as "first", "second", "third", etc., in the claims to modify a claim element does not by itself connote any priority, precedence, or order of one claim element over another or the temporal order in which acts of a method are performomned, but are used merely as labels to distinguish one claim element having a certain name from another element having a same name (but for use of the ordinal term) to distinguish the claim elements.

What is claimed is:

1. A method for conducting event betting comprising acts of:

providing for a bettor to place, via a computer system, one or more bets while the bettor is off-site from a land-based casino;

providing for the bettor to register the one or more bets with the land-based casino while the bettor is off-site from the land-based casino; and accepting a payment for the one or more registered bets by the land-based casino, the payment made by the bettor in person, while physically present at the land-based casino.

2. The method according to claim 1, wherein the act of providing for the bettor to register the one or more bets includes an act of registering the one or more bets using interactive television.

3. The method according to claim 1, wherein the act of providing for the bettor to register the one or more bets includes an act of registering the one or more bets using at least one of the Internet or a website.

4. The method according to claim 3, wherein the bet is a bet proposed by the bettor and not listed on the website.

5. The method according to claim 1, further comprising an act of providing for the bettor to view at least one of the one or more registered bets.

6. The method according to claim 1, further comprising an act of providing, to the bettor, a registration number for the one or more registered bets.

7. The method according to claim 6, wherein the act of providing a registration number to the bettor is performed by a website operator.

8. The method according to claim 1, further comprising an act of providing for the bettor to pay for the one or more bets within the land-based casino using at least one of a cashier, a kiosk, or a wireless interface.

9. The method according to claim 1, further comprising acts of accepting, by the land-based casino, a registration number from the bettor and confirming the registration number for the one or more bets.

10. The method according to claim 1, further comprising providing for the bettor to pay for the one or more registered bets with at least one of money or loyalty points.

11. The method according to claim 10, further comprising providing for the bettor to pay for the one or more registered bets by at least one of cash, a debit card, a credit card, an account credit, or a loyalty program credit.

12. The method according to claim 1, further comprising an act of determining a payout for at least one of the one or more registered bets.

13. The method according to claim 12, wherein the payout for winning includes at least one of money, a credit, merchandise, or loyalty points.

14. The method according to claim 12, wherein the determined payout includes money, and the method further comprises an act of paying out money including providing at least one of cash, a check, a debit card, or an account credit.

15. The method according to claim 12, wherein the determined payout includes loyalty points, and the method further comprises an act of paying out loyalty points including providing at least one of a loyalty program credit or an account credit.

16. The method according to claim 1, wherein at least one of a website operator or a computer system automatically determines if the one or more registered bets is a winning bet.

17. The method according to claim 16, wherein at least one of the website operator or computer system automatically notifies the bettor of the winning bet.

18. The method according to claim 17, wherein the bettor is automatically notified of a win in an electronic manner, including at least one of an e-mail message, the Internet, a telephone, or a text message.

19. The method according to claim 1, wherein odds for the one or more bets are set when the one or more bets are registered.

20. The method according to claim 1, wherein odds for the one or more bets are set when the one or more bets are paid for.

21. The method according to claim 1, wherein odds for the one or more bets change as the event approaches.

22. The method according to claim 1, further comprising an act of requiring the bettor to return to the land-based casino to receive winnings.

23. The method according to claim 1, wherein the event is a sports event.

24. The method according to claim 1, wherein the act of providing for the bettor to register the one or more bets includes registering one or more bets communicated by the bettor directly to the land-based casino.

25. The method according to claim 1, wherein the act of accepting is performed subsequent to the step of registering,

26. A system for conducting event betting comprising:

a sports betting component of a computer system, the sports betting component configured to provide for a bettor to place one or more bets while the bettor is off-site from a land-based casino and configured to provide for the bettor to register the one or more bets with the land-based casino while the bettor is off-site from the land-based casino; and a payment system component of a computer system, the payment system component configured to accept a payment for the one or more registered bets by the land-based casino, the payment made by the bettor while physically present at the land-based casino.

27. The system according to claim 26, wherein the sports betting component is configured to provide for the bettor to register the one or more bets using interactive television.

28. The system according to claim 26, wherein the sports betting component is configured to provide for the bettor to register the one or more bets using at least one of the Internet or a website.

29. The system according to claim 28, wherein the sports betting component is configured to provide for submission of a bet proposed by the bettor and not listed on the website.

30. The system according to claim 26, further comprising an interface configured to display at least one of the one or more registered bets to the bettor.

31. The system according to claim 26, wherein the sports betting component is configured to provide a registration number for the one or more registered bets to the bettor.

32. The system according to claim 31, wherein the registration number is provided by a website operator.

33. The system according to claim 26, further comprising at least one of a cashier, a kiosk, or a wireless interface configured to provide for the bettor to pay for the one or more bets within the land-based casino.

34. The system according to claim 26, wherein the sports betting component is further configured to accept a registration number from the bettor and confirm the registration number for the one or more bets.

35. The system according to claim 26, wherein the payment system component is configured to provide for bettor to pay for the one or more registered bets with at least one of money or loyalty points.

36. The system according to claim 35, wherein the payment system component is further configured to provide for bettor is to pay for the one or more registered bets by at least one of cash, a debit card, a credit card, an account credit, or a loyalty program credit.

37. The system according to claim 26, further comprising a payout component configured to determine a payout for at least one of the one or more registered bets.

38. The system according to claim 37, wherein the payout component is configured to provide for the payout for winning to include at least one of money, a credit, merchandise, or loyalty points.

39. The system according to claim 37, wherein the determined payout includes money, and the payout component is configured to pay out money in the form of at least one of cash, a check, a debit card, or an account credit.

40. The system according to claim 37, wherein the determined payout includes loyalty points, and the payout component is configured to pay out loyalty points, the paying out of the loyalty points including providing at least one of a loyalty program creditor or an account credit.

41. The system according to claim 26, further comprising a component which provides for at least one of a website operator or a computer system to automatically determine if the one or more registered bets is a winning bet.

42. The system according to claim 41, wherein the payout component provides for at least one of the website operator or the computer system to automatically notify the bettor of the winning bet.

43. The system according to claim 42, wherein the payout component provides for the bettor to be automatically notified of a win in an electronic manner, including at least one of by an e-mail message, by the Internet, by a telephone, or by a text message.

44. The system according to claim 26, wherein the sports betting component is configured to set odds for the one or more bets when the one or more bets are registered.

45. The system according to claim 26, wherein the sports betting component is configured to set odds for the one or more bets when the one or more bets are paid for.

46. The system according to claim 26, wherein the sports betting component is configured to change odds for the one or more bets as the event approaches.

47. The system according to claim 26, wherein the payment component is configured to require the bettor to return to the land-based casino to receive winnings.

48. The system according to claim 26, wherein the sports betting component is configured to provide for a bettor to place one or more bets on a sports event.

49. The system according to claim 26, wherein the sports betting component is configured to provide for the bettor to register the one or more bets by providing for communication by the bettor directly with the land-based casino.

50. The system according to claim 26, wherein the payment component is configured to accept the payment subsequent to the sports betting component registering the one or more bets.

51. A non-transitory computer readable medium encoded with computer-readable signals which define instructions that, as a result of being executed on a computer system, instruct the computer system to:

provide for a bettor to place one or more bets while the bettor is off-site from a land-based casino;

provide for the bettor to register the one or more bets with the land-based casino while the bettor is off-site from the land-based casino; and accept a payment for the one or more registered bets, the payment made by the bettor in person, while physically present at the land-based casino.

* * * * *